(12) United States Patent
Binmore

(10) Patent No.: US 9,076,095 B2
(45) Date of Patent: Jul. 7, 2015

(54) EXTENDABLE IDENTIFICATION TAG

(75) Inventor: Ian Rex Binmore, Houston, TX (US)

(73) Assignee: Vallourec Oil and Gas France, S.A.S., Aulnoye-Aymeries (FR)

( * ) Notice: Subject to any disclaimer, the term of this patent is extended or adjusted under 35 U.S.C. 154(b) by 279 days.

(21) Appl. No.: 13/309,179

(22) Filed: Dec. 1, 2011

(65) Prior Publication Data

US 2013/0140367 A1 Jun. 6, 2013

(51) Int. Cl.
G06K 19/077 (2006.01)
(52) U.S. Cl.
CPC .... G06K 19/07758 (2013.01); G06K 19/07779 (2013.01)
(58) Field of Classification Search
CPC .................. G06K 19/07758; G06K 19/07779;
G06K 19/04; G06K 19/077; G06K 19/005;
A61B 19/44; A61B 2019/448; G08B 13/2434
See application file for complete search history.

(56) References Cited

U.S. PATENT DOCUMENTS

| 5,360,967 | A  | * | 11/1994 | Perkin et al. ................... 235/375 |
| 7,277,017 | B2 | * | 10/2007 | Baba et al. ................. 340/572.7 |
| 2003/0102978 | A1 | * | 6/2003 | Schwandner .............. 340/693.5 |
| 2005/0189679 | A1 | * | 9/2005 | Kenison et al. .......... 264/272.11 |
| 2005/0230110 | A1 | * | 10/2005 | Ellison et al. ............... 166/255.1 |
| 2006/0186210 | A1 | * | 8/2006 | Tethrake et al. ............... 235/492 |
| 2010/0054891 | A1 | * | 3/2010 | Nishida et al. .................... 411/9 |
| 2010/0090012 | A1 | * | 4/2010 | Moritz .......................... 235/492 |
| 2010/0289647 | A1 | * | 11/2010 | Rudduck et al. ........... 340/572.1 |
| 2011/0084796 | A1 | * | 4/2011 | Savry .............................. 340/5.8 |
| 2011/0315776 | A1 | * | 12/2011 | Baba et al. ..................... 235/492 |
| 2014/0210614 | A9 | * | 7/2014 | Muirhead ................ 340/539.13 |

* cited by examiner

Primary Examiner — Sonji Johnson
(74) Attorney, Agent, or Firm — Oblon, McClelland, Maier & Neustadt, L.L.P.

(57) ABSTRACT

An identification system comprising an extendable identification tag. An identification tag, such as an RFID tag having an electronics module configured to transmit information is provided. The identification tag includes a body portion and a sleeve portion. The sleeve portion is arranged about the body portion such that the sleeve portion can traverse a length of the body portion, thereby extending the overall length of the identification tag. The identification tag may be adjusted to match the thickness of an object, such as a flange, such that the identification tag may be disposed in a tag pocket formed through the object and adjusted to approximately match the thickness of the object so as to be readable from opposing sides of the objects.

37 Claims, 4 Drawing Sheets

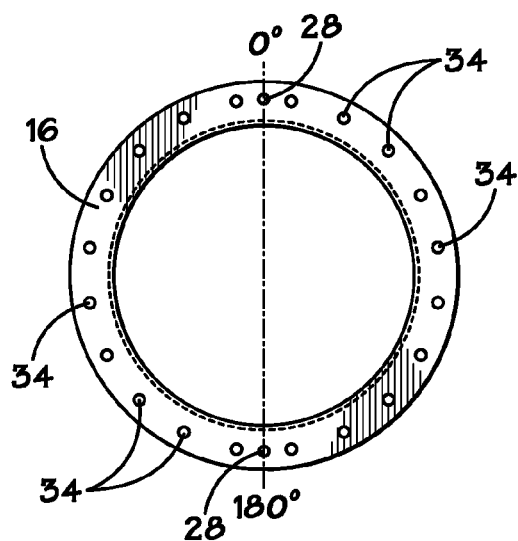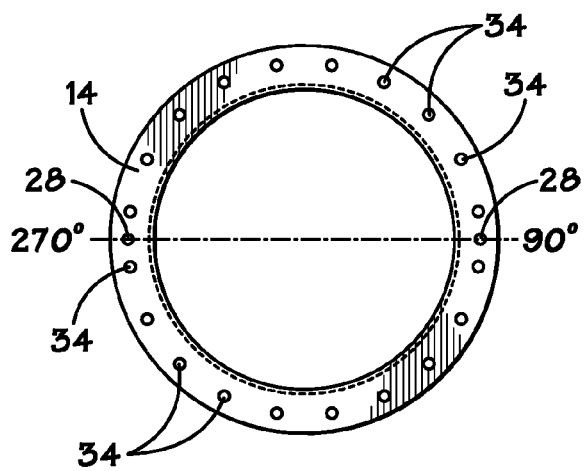
FIG. 3A  FIG. 3B
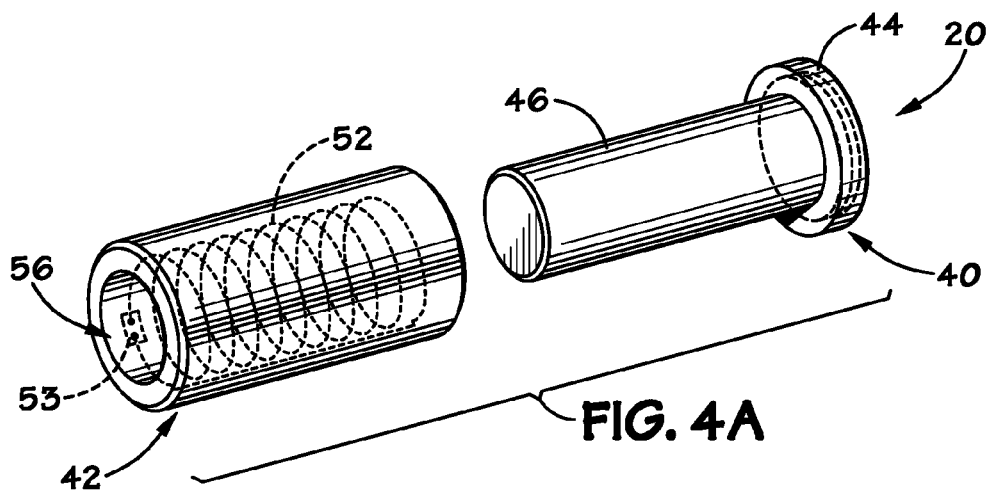
FIG. 4A
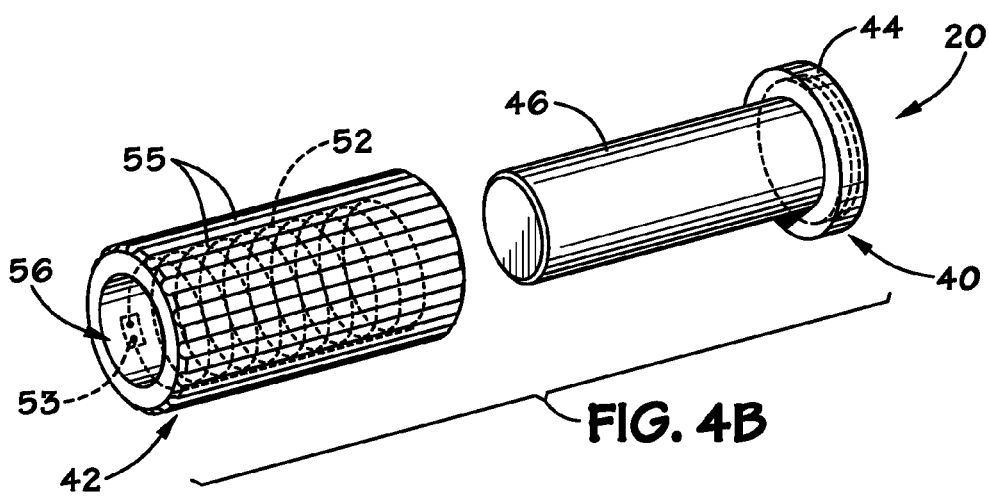
FIG. 4B

EXTENDABLE IDENTIFICATION TAG

BACKGROUND

1. Field of Invention

Embodiments of the invention relate generally to identification tags, and more specifically, to extendable identification tags configured for installation into objects.

2. Description of Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light and not as admissions of prior art.

Identification tags are often used to manage and track objects, such as system components, tools, machinery, equipment, etc., through production, inventory, storage, deployment and/or product use. One type of identification tag that is commonly used to track objects is a radio frequency identification (RFID) tag. In general, RFID tags include a microchip or integrated circuit used to transmit and/or store identification and possibly other information. An external transceiver/interrogator/reader located remotely with respect to the RFID tag is used to receive information from and/or transmit information to the RFID tag. The RFID tag typically includes an antenna that transmits RF signals relating to the identification and/or information stored within the RFID tag.

For certain applications, such as surface and downhole oil, gas and other applications, RFID tags may be utilized to track equipment and inventory. However, to be particularly useful, the RFID tags should be designed such that equipment can be tracked while in storage, transit, and field use, (i.e., surface, downhole and underwater), depending on the type of equipment and the utilization thereof. Designing RFID tags to be readable from multiple positions (e.g., while in a warehouse and while in use) offers a number of challenges. Further, for downhole or underwater applications, the durability of such RFID tags presents a number of additional challenges. Among the various considerations are structural integrity through a wide range of temperatures and pressures, as well as mechanical forces, readability of the RFID tag and ease of installation, for instance. Also, because tools and equipment are often various sizes, the size and configuration of the tools and equipment provide additional considerations in designing an optimized identification tag for tracking such components.

It may be desirable to design an optimized identification tag for tracking variously sized components utilized in surface and downhole applications. Accordingly, embodiments of the present disclosure utilize either single or dual RF types of identifiers embedded in RF opaque material, such as steel, to read from either side of material of varying thickness.

BRIEF DESCRIPTION OF DRAWINGS

Certain embodiments are described in the following detailed description and in reference to the drawings in which:

FIGS. 3A-3B illustrate cross-sectional views of the front face of each flange illustrated in FIG. 2, in accordance with embodiments of the invention;

FIGS. 4A-4C illustrate schematic views of extendable identification tags, in accordance with embodiments of the invention;

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, embodiments of the invention are directed to an extendable identification system, such as an RFID system including an RFID tag configured for installation into an object. In certain embodiments, the object may include a structure such as a flange, weldment, or casting. For instance, the identification tag may be configured for installation into the flange of a dredge pipe. As discussed further below, the identification tag is extendable such that one tag design can be used in objects, such as the flange of a dredge pipe, of various thicknesses. Specifically, the identification tag is extendable such that it may be used in flanges having any one of a number of thicknesses within a design range. Depending on the application and the materials used, the identification tag may be particularly well suited for downhole and subsea drilling, mining or industrial equipment, while the object is stored as inventory, or in use in field applications. As will be described in further detail below, the disclosed identification tag is optimized for installation in objects having a range of thicknesses and may advantageously provide readability from multiple surfaces and directions. Specifically, the identification tag is extendable, such that it may be inserted into a pocket formed through the object (e.g., flange) and extended to approximately the thickness of the object such that it may be read from opposing surfaces of the object. Further, multiple identification tags may be used to increase the readability of the identification tags within the object.

Figure 1:
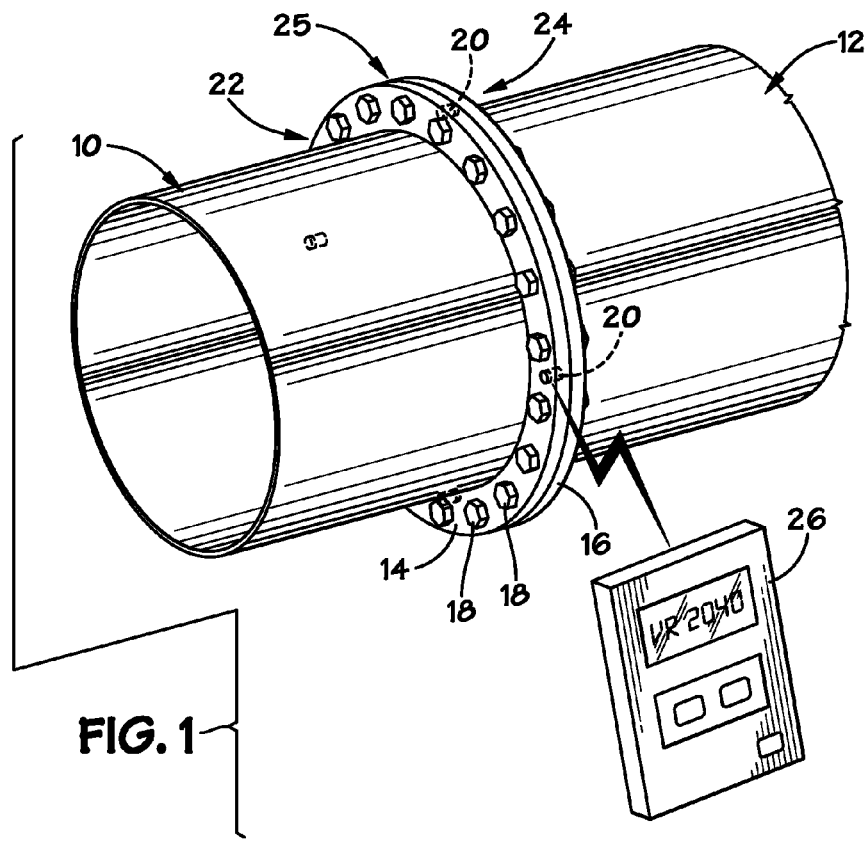
FIG. 1 illustrates a schematic view of an identification tag system including an extendable RFID tag installed within the flange of a dredge pipe, in accordance with embodiments of the invention.

Turning now to the drawings, and referring initially to FIG. 1, dredge pipes 10 and 12 are illustrated. The dredge pipes 10 and 12 are mechanically coupled together at their respective flanges 14 and 16 by bolts 18. As will be appreciated, this type of coupling between dredge pipes 10 and 12 is common in field applications for dredging and subsea pipelines, for instance.

In addition, the dredge pipes 10 and 12 of FIG. 1 include identification tags 20 inserted within pockets formed through the flanges 14 and 16. In one embodiment, the pockets may be holes that extend entirely through a respective flange 14 and 16 (i.e., creating a hole from one surface to the opposing surface). As will be described and illustrated in greater detail below, the arrangement of the pockets and the configuration of the identification tags 20 allows the identification tags 20 to be read from opposing directions 22 and 24, when the dredge pipes are attached to one another to form a dredge pipe joint 25, as in FIG. 1, or unattached (as in FIG. 2), as they would be while stored in inventory. Typically, dredge pipes are stored in large stacks with their flanges (e.g., 14 and 16) faces facing outward, making the back of the flange (e.g., 14 and 16) largely inaccessible. When the flanges 14 and 16 are connected together, the face of the flange would become inaccessible. Accordingly, embodiments of the invention include identification tags 20. The identification tags 20 are extendable such that they can be expanded and contracted to fit within pockets formed in flanges (or other objects) of varying thicknesses, as described in greater detail below.

In addition to the identification tags 20, the identification system includes a reader 26. The reader 26 is generally configured to interrogate the tags 20. Accordingly, the reader 26 typically includes a transmitter and receiver for exchanging identification information with the tags 20. The reader 26 may also include a processor for receiving the identification data from the tag 20 and extrapolating the data into meaningful data whereby identification or other stored information can be perceived by a user. In certain embodiments, the reader 26 may be integrated with a computer system.

As previously described, each identification tag 20 may be a radio frequency identification (RFID) tag. While the identification tag 20 is described herein as an RFID tag 20, other types of identification tags, such as Sonic Acoustic Wave tags, may also be utilized in accordance with the embodiments described herein. That is, the extendable identification tags 20 may alternatively include other identification technology than RFID technology. As will be described in greater detail below, the RFID tag 20 may include one or more electronics modules. Each electronics module includes an associated integrated circuit capable of storing and processing identification and other information, as well as manipulating RF signals. The electronics module further includes an antenna for transmitting and receiving RF signals. The RFID tag 20 may be passive, active, or semi-active. Passive RFID tags rely on the reader to provide the power source for activation. While passive RFID tags 20 may be employed for certain applications, active or semi-active RFID tags 20 may be more suitable for applications where the reader 26 is located beyond the range of the RFID tag's ability to passively communicate with a reader. If the RFID tag 20 is active or semi-active, the RFID tag 20 may include a battery for transmission of RF signals. As will be described, the RFID tag 20 includes electronics identification that can be read from either side of the flange surfaces once the RFID tag 20 is inserted into a hole drilled through the flange 14 or 16.

In one embodiment that may be particularly useful in subsea equipment, the electronics module may be a low frequency module contained within an impermeable spherically ended cylinder or bead made of high purity industrial grade glass. For some applications, an optimal frequency for the RFID electronics module is 125 KHz-135 KHz, but in other applications a different frequency range may be preferred. In some applications, a high frequency RFID electronics module can be used.

Further, in one embodiment, each electronics module in the tag 20 may contain a dipole including a ferrite core and an antenna, which is wrapped around the ferrite core. The antenna may be bonded to the integrated circuit, which includes the identification information stored thereon for reading the RFID tag 20. In one embodiment, the integrated circuit includes an erasable programmable read only memory (EPROM). RF Acoustic Wave devices may be deployed in a similar manner where temperatures exceeding 200° C. are experienced during usage. The use of a dipole RFID tag 20 may provide desirable performance when installed within a radio opaque material, such as a steel material. The use of a ferrite core and coil allows a passive transmission of near field RF signals to be passed from a coil at one end of the tag to the RFID electronics module at the other end of the tag even when the tag is installed into a through hole in RF opaque materials such as steel. The design enables longer read distances with any RF based system, especially low frequency RF systems, a single electronics module and readability from either end of the tag in a device that can extend to various material thicknesses. The RFID tag 20 will be described and illustrated further below with regard to FIGS. 4A-8.

Figure 2:
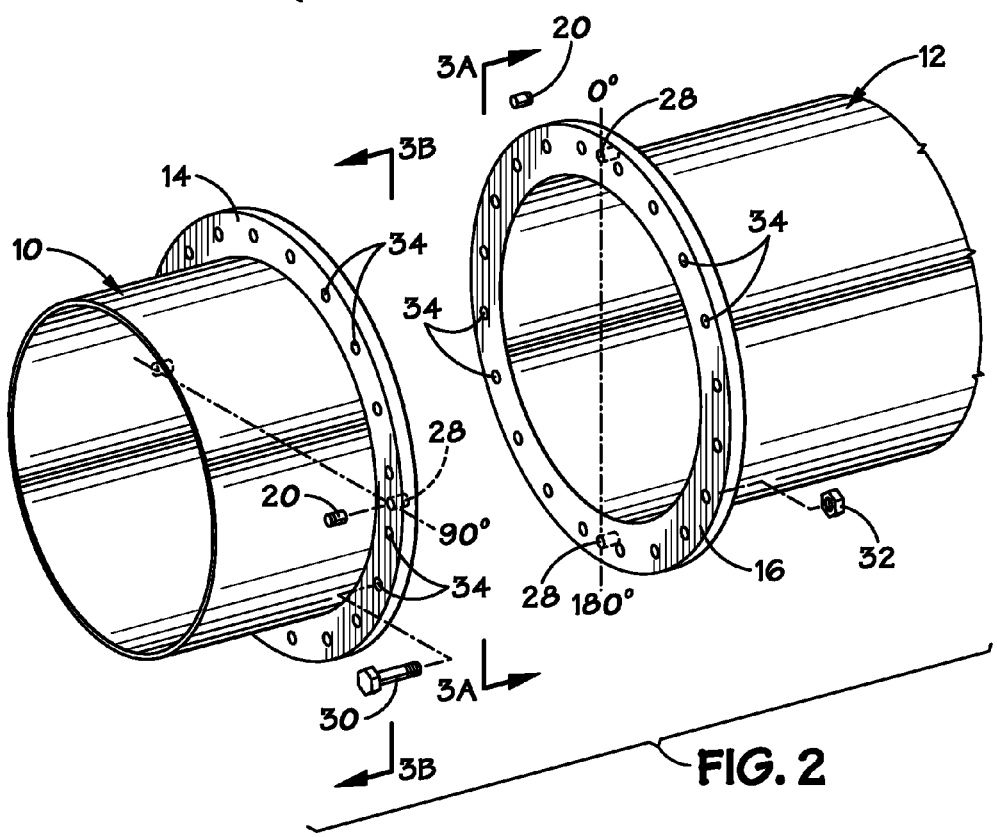
FIG. 2 illustrates a schematic view of two dredge pipes configured to be coupled together at their respective flanges and having extendable identification tags mounted therein, in accordance with embodiments of the invention.

Referring now to FIGS. 2, 3A and 3B, various views of the arrangement of the RFID tags 20 within the flanges 14 and 16 are illustrated, in accordance with one embodiment. Specifically, as best illustrated in FIG. 2, each flange 14 and 16 may include two tag pockets 28, each configured to receive a respective RFID tag 20. In the illustrated embodiment, each of the tag pockets 28 is located 180° from the other tag pocket 28, along the circumference of the flange 14 and 16. As will be appreciated one RFID tag 20 or more than two RFID tags 20 may be employed in alternate embodiments. By forming the tag pockets 28, 180° from one another, and thus arranging the RFID tags at opposing sides of the circumference of the flanges 14 and 16, detectability and readability of the RFID tags 20 is increased, regardless of the position of the reader 26 relative to the pipe 10 and 12.

In addition, when a flange 14 is coupled to a flange 16, to form a pipe joint 25 (FIG. 1) via bolts 30 and nuts 32, for instance, and secured within the bolt holes 34 around the circumference of the respective flanges 14 and 16, the tag pockets 28, and thus, the RFID tags 20, may be arranged to further optimize detectability and readability of the multiple RFID tags 20 within the overall piping system. For instance, the flange 16 of dredge pipe 12 may be secured to the flange 14 of the dredge pipe 10, such that the each of RFID tags 20 included in the pipe joint 25 are located at 90° from one another. Specifically, the flange 16 may include tag pockets 28, having RFID tags 20 therein, located at 0° and 180°, as illustrated in FIGS. 2 and 3A. The flange 14 may include tag pockets 28 having RFID tags 20 therein, located at 90° and 270°, as illustrated in FIGS. 2 and 3B. By coupling the flanges 14 and 16 together to form a pipe joint 25 in this configuration, the coupled piping system is detectable from multiple angles by the reader 26.

In the illustrated embodiment, each tag pocket 28 is a hole that is formed through a flange 14 or 16. The tag pockets 28 may be drilled through the flange 14 or 16, for instance. Advantageously, the tag pocket 28 may be formed by a single drill and may be formed in existing equipment or tools, to retrofit the equipment or tools with an identification and tracking mechanism (i.e., the RFID tags 20). In one embodiment, the tag pocket 28 may be threaded. As will be described further below, the RFID tag 20 is extendable such that it fits entirely within the thickness of the flange 14 or 16 and such that it may be extended to approximately the thickness of the flange 14 or 16. The tag pocket 28 is sized to receive the RFID tag 20. In certain embodiments, the tag pocket 28 may be sized such that the RFID tag 20 fits securely into the tag pocket 28 where the RFID tag 20 is secured merely by mechanical frictional forces. Alternatively, or in addition, the RFID tag 20 may be secured in the tag pocket 28 with an adhesive or epoxy, for instance.

Figure 4C:
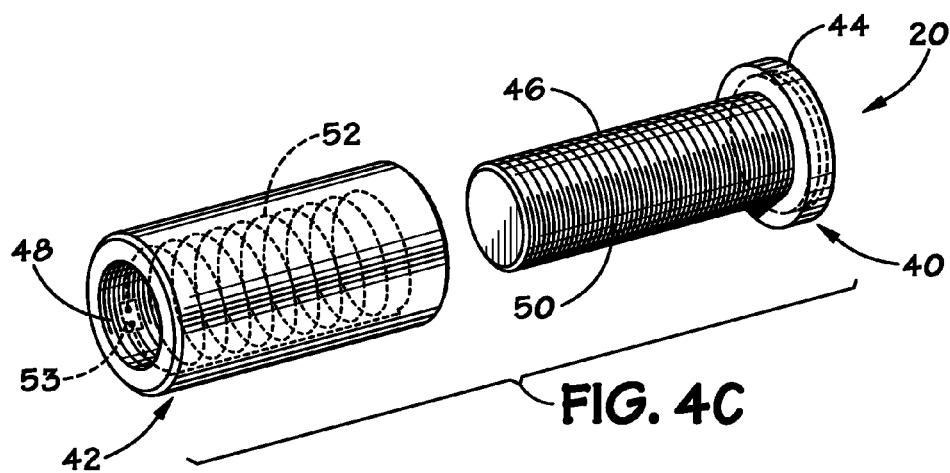

Turning now to FIGS. 4A-4C, three embodiments of the extendable RFID tag 20 are illustrated. In general, and depending on the application, the materials used to construct the RFID tag 20 may be chosen to withstand external influences for the particular application in which the RFID tags 20 are to be used. For instance, in rugged applications, such as dredging and subsea applications, the RFID tag 20 may be designed to withstand cyclical loading pressures to 700 Bar/ 1020000 psi. The RFID tag 20 may be operable at temperatures in the range of approximately −40° C. to 100° C. Further, the RFID tag 20 may be designed to survive in extended exposure temperatures in the range of approximately −78° C. to 200° C. Further, the materials used to fabricate the RFID tag 20 may be chosen such that they are capable of withstanding at least a six year exposure to salt water at temperature ranges between approximately 0° C. to 45° C. The materials for the RFID tag 20 may be chosen such that the RFID tag 20 is not susceptible to corrosion and does not significantly impact the corrosion rate of the material into which the RFID tag 20 will be installed (e.g., a steel flange). The material may be abrasion resistant, such that exposed surfaces of the RFID tag 20 are not susceptible to mechanical forces or chemical reactions.

In one embodiment, the RFID tag 20 may be formed using a high performance thermoplastic, such as PolyEtherEther-Ketone (PEEK). Advantageously, PEEK thermoplastic is highly resistant to chemicals, has high strength, absorbs impacts well, has a high melting point and maintains a low brittleness at very low temperature. Pigment can be added to the plastic for UV resistance as desired. Alternatively, other radio transparent materials can be used instead of PEEK thermoplastic, depending on the environmental and operational characteristics of the application. For example, Acrylonitrile Butadiene Styrene (ABS) or other molded plastic could be used under some environmental and operational conditions.

Each RFID tag 20 includes a body portion 40 and a sleeve portion 42. The body portion 40 and the sleeve portion 42 are configured to mateably engage. In the embodiments illustrated in FIGS. 4A-4C, the body portion 40 includes a base 44 and a rod 46. As illustrated, the base portion 40 and the sleeve portion 42 may be detachable from one another. Alternatively, the sleeve portion 42 and the base portion 40 may not be fully detachable from one another. The base 44 includes the electronics module (illustrated below with reference to FIGS. 5A and 5B). As previously described, the electronics module includes an integrated circuit, as well as an antenna. The sleeve portion 42 is sized to fit about the rod 46 of the body portion 40. In the embodiment illustrated in FIG. 4A, the sleeve portion 42 is sized to slideably engage the rod 46 of the body portion 40. In the embodiment of FIG. 4B, the sleeve portion 42 includes grooves 55 to allow excess epoxy to flow about outer portions of the rod 46 (as illustrated in FIG. 6, for instance). In the embodiment illustrated in FIG. 4C, the sleeve portion 42 includes interior threading 48 and is sized to engage the rod 46 of the body portion 40, along the exterior threading 50 of the rod 46.

Whether slideably engageable as in FIGS. 4A and 4B or engageable via mateable threading 48 and 50 as in FIG. 4C, the RFID tag 20 is configured such that the sleeve portion 42 may be extended or contracted along the length of the rod 46 to increase or decrease the overall length of the RFID tag 20. Thus, as will be illustrated and discussed further below, the RFID tag 20 can be adjusted by setting the position of the sleeve portion 42 along the rod 46 of the body portion 40 to achieve a desired overall length of the RFID tag 20. For instance, as will be illustrated with regard to FIGS. 5 and 6, the overall length of the RFID tag 20 may be adjusted to be approximately equal to (or slightly less than) the thickness of a flange. In order to set the position of the sleeve portion 42, an epoxy or glue may be used. Bleed holes may also be included to allow for excess epoxy or glue which may be used to secure the body portion 40 to the sleeve portion 42, or which may be used to secure the RFID tag 20 within a tag pocket 28, to escape.

The sleeve portion 42 may include a coil 52 and one or more embedded tuning capacitors 53. The rod 46 may be made of a ferrite core material which serves to interact with the coil 52 embedded in the sleeve portion 42 such that an RF signal received at the face of the sleeve portion 42 opposite the electronics module embedded in the base 44 (illustrated in FIGS. 5A and 5B) serves to transmit the signal from one end of the RFID tag 20 to the other.

Figure 5A:
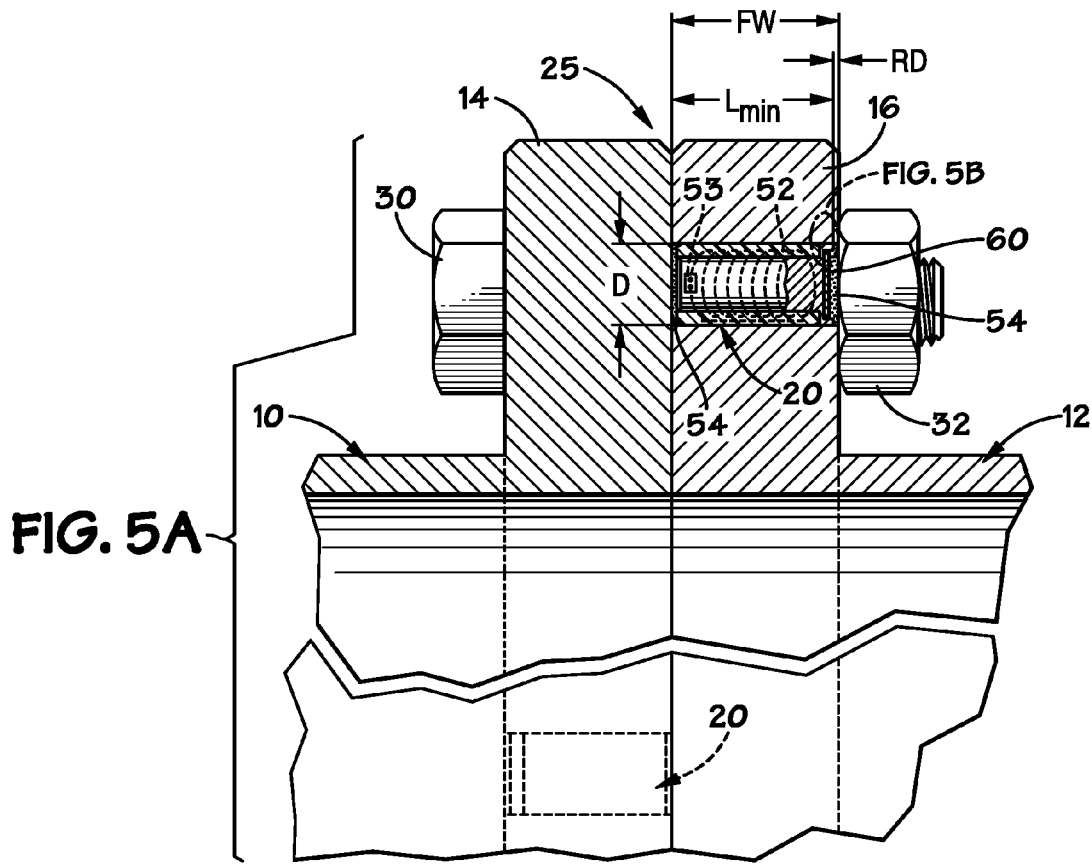
FIGS. 5A and 5B illustrates schematic views of two dredge pipes mechanically coupled together to form a longer section of pipe and having an extendable identification tag mounted therein, in accordance with embodiments of the invention.
Figure 5B:
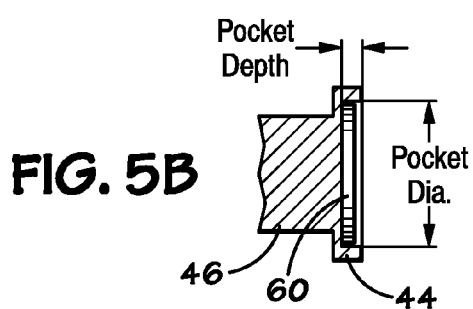
Figure 6:
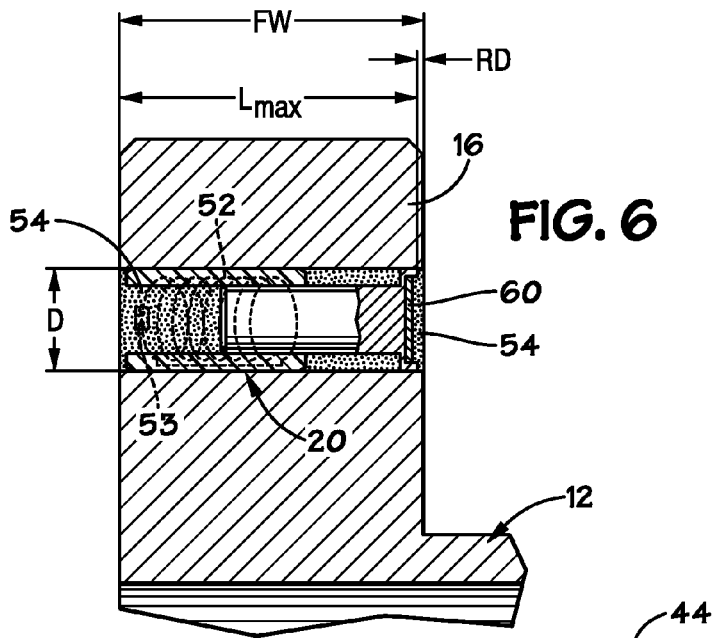
FIG. 6 illustrates a schematic view of portion of a flange having an extendable identification tag mounted therein, in accordance with embodiments of the invention.

Referring now to FIGS. 5A and 5B, a partial cross-sectional view of an extendable RFID tag 20 disposed within a tag pocket 28 of a flange 16 is illustrated. As will be appreciated, FIGS. 5A and 5B illustrates a portion of a pipe joint 25, wherein the flanges 14 and 16 have been mechanically joined using a bolt 30 and a nut 32, as previously discussed with regard to FIGS. 2, 3A and 3B. A shadowed view of a second RFID tag 20 within the flange 14 is also illustrated. As described above, each pipe joint 25 may include several RFID tags 20 (e.g., four) arranged to maximize detectability.

As illustrated in FIGS. 5A and 5B, the RFID tag 20 is fully compressed. That is, the sleeve portion 42 is engaged about the body portion 40, such that that length of the RFID tag 20 is maximally compressed to the minimum length $L_{min}$ achievable by the RFID tag 20. In the illustrated embodiment, when the RFID tag 20 is maximally compressed, the minimum length $L_{min}$ of the RFID tag 20 will be less than or equal to the flange width FW. In the illustrated embodiment, a slight recess depth RD may be provided to ensure that the RFID tag 20 is fully contained within the flange 16. In general, the length L of the RFID tag 20 may be set such that it is slightly less than the flange width FW (e.g., by the recess depth RD). That is, FW=L+RD.

In one embodiment, the RFID tag 20 is configured for a flange having a flange width FW in the range of 60 mm-120 mm. That is, the RFID tag 20 is configured such that the minimum achievable length when fully compressed $L_{min}$ is less than or equal to 60 mm (e.g., 58 mm), as illustrated in FIGS. 5A and 5B. The maximum achievable length of the RFID tag 20 when fully extended $L_{max}$ is less than or equal to 120 mm (e.g., 118 mm), as illustrated in FIG. 6. As will be appreciated, the RFID tag 20 can be adjusted to fit within a flange having a flange width (FW) within the prescribed design range (e.g., 60 mm-120 mm). The recess depth RD may be in the range of approximately 1 mm-3 mm, for instance.

As also illustrated in FIGS. 5A, 5B and 6, the RFID tag 20 has a diameter D at its widest portion (e.g., the diameter of the sleeve portion 42) that is approximately equal to the diameter of the tag pocket 28. In one embodiment, the diameter D may be in the range of 20 mm-24 mm. As will be appreciated, the tag pocket 28 may be drilled, or otherwise formed, such that it is sized to accommodate the RFID tag 20. In one embodiment, the tag pocket 28 may be sized such that the RFID tag 20 may be inserted within the tag pocket 28 with some amount of mechanical force, whereby the RFID tag 20 is frictionally secured within the tag pocket 28. Once installed within the pocket, a potting material 54 may be injected to secure the RFID tag 20 within the tag pocket 28. For instance, referring briefly to FIG. 4A again, a caulking gun may be used to dispense a thixotropic material into an opening 56 at one end of the RFID tag 20, once the sleeve portion 42 is engaged about the body portion 42. Excess potting material 54 (FIGS. 5A and 5B) may be bled out through bleed holes and/or through holes in the base 44 (not shown).

Also illustrated in FIGS. 5A, 5B and 6 is the electronics module 60. As illustrated, in one embodiment, the electronics module 60 is contained within the base 44 of the body portion 40 of the RFID tag 20. As best illustrated in FIG. 5B, the electronics module 60 may be dispensed within a pocket of the base 44 having a given pocket depth and diameter. The electronics module 60 may be secured within the pocket by a suitable epoxy or may be formed within the base 44 via a molding process, for instance. Alternatively, or additionally, an electronics module may be contained within a base of the sleeve portion 42, as will be described and illustrated with regard to FIGS. 7 and 8. As previously described, the electronics module 60 includes an integrated circuit and an antenna which may be used to store, receive and convey information, such as identification information, to a reader 26 (FIG. 1). In one embodiment, the electronics module 60 comprises a low frequency RFID electronics module. For some applications, an optimal frequency for the electronics module 60 is 125 KHz-135 KHz, but in other applications a different frequency range may be preferred. In some applications, a high frequency electronics module 60 may be employed. Transmission of the RF signal from one end of the RFID tag 20 to the other when the RFID tag 20 that is installed in a through hole in RF opaque material, occurs by transmission of the RF signals through passively coupled components of the coil 52 embedded in the sleeve portion 42 and the rod 46 made of a ferrite core. The coil 52 is tuned with tuning capacitors 53 installed in series with the closed coil 52. The rod 46 made of a ferrite core material serves to interact with the coil 52 embedded in the sleeve portion 42 such that the RF signals received at the face of the sleeve portion 42 at the opposite end of the RFID tag 20 from the electronics module 60 embedded in the base 44 will serve to transmit the signal from one end of the RFID tag 20 to the other.

In one embodiment, the electronics module 60 contains a dipole including a ferrite core and an antenna in a high pressure tolerant package, which is in close proximity to the ferrite core rod 46. This assembly isolates the sensitive electronics from the rest of the RFID tag 20 while providing a passive electronic link between the ends of the RFID tag 20 and the electronics module 60. The use of a dipole RFID tag 20 may provide desirable performance when installed within a radio opaque material, such as a steel material. The design enables longer read distances with any RF based system, especially low frequency RF systems. The antenna may be bonded to the integrated circuit, which includes the identification information stored thereon for reading the RFID tag 20. In one embodiment, the integrated circuit includes an erasable programmable read only memory (EPROM). RF Acoustic Wave devices may be deployed in a similar manner where higher temperatures are experienced during usage. For rugged applications, such as downhole or underwater usage, the electronics module 60 includes wire bondings that are appropriate for the sustained high and low temperatures and carries an identifier in such a manner that the identity of the RFID tag 20 will not be lost during sustained high temperature exposure. In one embodiment, the electronics module 60 includes packing materials which allow operation of the RFID tag 20 at sustained temperatures over 160° C., and in another embodiment, over 180° C. The electronics module 60 may be designed such that it will continue to perform well in high magnetic fields and such that it will not be destroyed by rapid and strong magnetic fluctuations to which it may be exposed.

Figure 7:
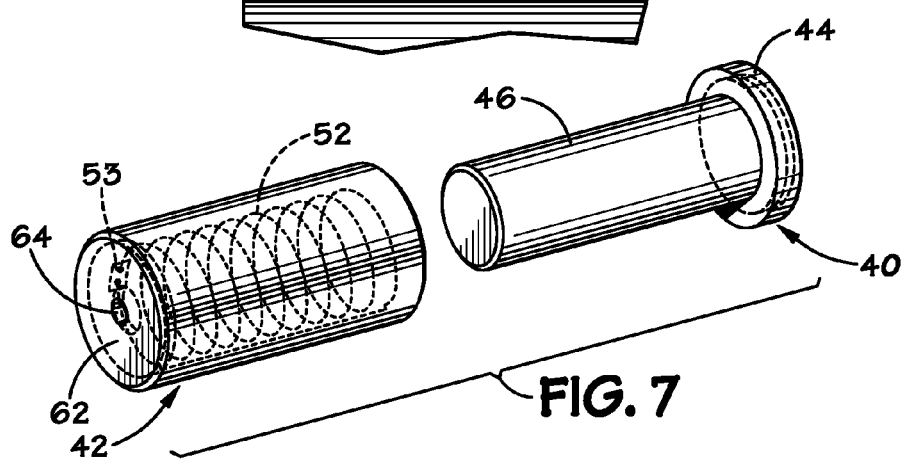
FIG. 7 is a schematic view of an extendable identification tag, in accordance with embodiments of the invention.
Figure 8:
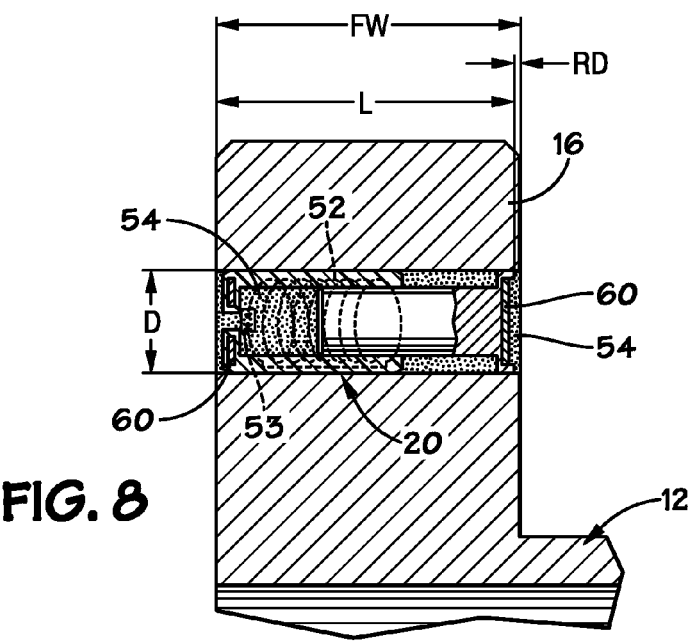
FIG. 8 illustrates a schematic view of portion of a flange having the extendable identification tag of FIG. 7 mounted therein, in accordance with embodiments of the invention.

Referring now to FIGS. 7 and 8, an alternative embodiment of an RFID tag 20 is illustrated. Specifically, the sleeve portion 42 of the RFID tag 20 includes a base 62, such that the end of the sleeve portion 42 is closed. To allow for the injection of potting material, end holes 64 may be provided in one or both of the body portion 40 and the sleeve portion 42. Further, as illustrated in FIG. 8, a second RFID tag 20 may be included in the base 62 to provide improved detectability or redundancy. In another embodiment (not illustrated), the RFID tag 20 may include only a single RFID tag 20 within the base 62 of the sleeve portion 42, instead of the base 44 of the body portion 40.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:
1. An identification tag, comprising:
an electronic module configured to transmit information;
a body portion including the electronic module; and
a sleeve portion comprising a coil embedded therein,
wherein the sleeve portion extends along an outside surface of the body portion,
wherein the sleeve portion is movable along a length of the outside surface of the body portion, and
wherein the movement of the sleeve portion along the length of the outside surface of the body portion changes a length of the identification tag.
2. The identification tag, as set forth in claim 1, wherein the electronics module is configured to transmit and receive RF signals.
3. The identification tag, as set forth in claim 1, wherein the electronics module comprises a dipole antenna.
4. The identification tag, as set forth in claim 1, wherein the electronics module is configured to operate at a frequency in the range of approximately 125 KHz-135 KHz.
5. The identification tag, as set forth in claim 1, wherein the electronics module comprises an integrated circuit and an antenna.
6. The identification tag, as set forth in claim 5, wherein the integrated circuit and the antenna are surrounded by glass.
7. The identification tag, as set forth in claim 1, wherein the body portion and the sleeve portion each comprise a thermoplastic.
8. The identification tag, as set forth in claim 7, wherein the thermoplastic comprises a polyetheretherketone (PEEK).
9. The identification tag, as set forth in claim 1, wherein the sleeve portion is configured to traverse a distance along a length of the body portion, such that an overall length of the identification tag may be adjusted to a minimum length of approximately 60 mm and a maximum length of approximately 120 mm.

10. The identification tag, as set forth in claim 1, wherein the sleeve portion is configured to slideably traverse the distance along the length of the body portion.

11. The identification tag, as set forth in claim 1, wherein each of the sleeve portion and the body portion are threaded such that the sleeve portion is configured to traverse the distance along the length of the body portion via the threading.

12. The identification tag, as set forth in claim 1, wherein the body portion comprises a base and a rod extending therefrom, wherein the sleeve portion is configured to traverse a distance along the length of the rod.

13. The identification tag, as set forth in claim 12, wherein the electronics module is contained within the base of the body portion.

14. The identification tag, as set forth in claim 1, wherein the identification tag comprises a second electronics module configured to transmit information.

15. The identification tag, as set forth in claim 14, wherein the electronics module is contained within the body portion and the second electronics module is contained within the sleeve portion.

16. The identification tag, as set forth in claim 1, wherein the sleeve portion comprises one or more tuning capacitors coupled to the coil.

17. The identification tag, as set forth in claim 16, wherein the body portion comprises a ferrite core and wherein the body portion and the sleeve portion form a passive inductive link between opposite ends along the length of the identification tag through the coil and the ferrite core.

18. An identification tag, comprising:
an electronic module configured to transmit information;
a body portion including the electronic module; and
a sleeve portion comprising a coil embedded therein,
wherein the sleeve portion extends along an outside surface of the body portion;
wherein the sleeve portion is movable along a length of the outside surface of the body portion, and
wherein the identification tag is extendable by movement of the sleeve portion along the length of the outside surface of the body portion such that a length of the identification tag may be adjusted between a minimum length and a maximum length.

19. The identification tag, as set forth in claim 18, wherein the minimum length is approximately equal to 60 mm.

20. The identification tag, as set forth in claim 18, wherein the maximum length is approximately equal to 120 mm.

21. The identification tag, as set forth in claim 18, wherein the electronics module is configured to transmit and receive RF signals.

22. The identification tag, as set forth in claim 18, comprising a first portion and a second portion, wherein the first portion is configured to traverse a length of the second portion such that the length of the identification tag may be adjusted between the minimum length and the maximum length.

23. The identification tag, as set forth in claim 22, wherein the first portion comprises the electronics module disposed therein.

24. The identification tag, as set forth in claim 23, wherein the second portion comprises a second electronics module disposed therein.

25. The identification tag, as set forth in claim 18, wherein the identification tag is configured to be disposed within a tag pocket formed in an object.

26. The identification tag, as set forth in claim 25, wherein the object comprises a flange.

27. A system comprising:
an object having a tag pocket formed therein; and
an extendable identification tag secured within the tag pocket,
wherein the extendable identification tag comprises a body portion including an electronic module and a sleeve portion compressing a coil embedded therein,
wherein the sleeve portion extends along an outside surface of the body portion;
wherein the sleeve portion is movable along a length of the outside surface of the body portion to adjust a length of the extendable identification tag; and
wherein the length of the extendable identification tag is adjustable such that a length of the extendable identification tag is approximately equal to a thickness of the object.

28. The system, as set forth in claim 27, wherein the object comprises a flange.

29. The system, as set forth in claim 27, wherein the tag pocket comprises a hole formed through the object such that the identification tag is exposed through the opening on two opposing surfaces of the object.

30. The system, as set forth in claim 27, wherein the extendable identification tag comprises an RFID tag.

31. The system, as set forth in claim 30, comprising a reader configured to transmit and receive RF signals to and from the RFID tag.

32. The system, as set forth in claim 27, wherein the object is configured for downhole or underwater usage.

33. The system, as set forth in claim 27, wherein the object comprises a second tag pocket formed therein, and a second extendable identification tag secured within the second tag pocket.

34. The system, as set forth in claim 33, wherein the second tag pocket is formed approximately 180 degrees from the first tag pocket.

35. The system, as set forth in claim 27, comprising a second object mechanically coupled to the first object to form a joint, wherein the second object comprises a second tag pocket formed therein, and a second extendable identification tag secured within the second tag pocket.

36. The system, as set forth in claim 35, comprising a third identification tag secured within a third tag pocket formed in the first object and a fourth identification tag secured within a fourth tag pocket formed in the second object.

37. The system, as set forth in claim 36, wherein each of the first identification tag, the second identification tag, the third identification tag and the fourth identification tag is located approximately 90 degrees from each immediately adjacent identification tag.

* * * * *